(12) United States Patent
Ota (10) Patent No.: US 7,330,124 B2
(45) Date of Patent: Feb. 12, 2008

(54) IMAGE CAPTURING APPARATUS AND MONITORING APPARATUS FOR VEHICLE DRIVER

(75) Inventor: Shunji Ota, Kyoto (JP)

(73) Assignee: Omron Corporation, Kyoto (JP)

( * ) Notice: Subject to any disclaimer, the term of this patent is extended or adjusted under 35 U.S.C. 154(b) by 148 days.

(21) Appl. No.: 11/371,778

(22) Filed: Mar. 9, 2006

(65) Prior Publication Data
US 2006/0202843 A1    Sep. 14, 2006

(30) Foreign Application Priority Data
Mar. 10, 2005   (JP)   ............................. 2005-067255

(51) Int. Cl.
*G08B 23/00* (2006.01)
*G06K 9/00* (2006.01)
(52) U.S. Cl. ...................................... 340/576; 382/118
(58) Field of Classification Search ................ 340/576; 382/118, 104; 359/838; 250/341.8; 348/370; 362/560
See application file for complete search history.

(56) References Cited

U.S. PATENT DOCUMENTS

| | | | |
|---|---|---|---|
| 6,400,835 B1 * | 6/2002 | Lemelson et al. | 382/118 |
| 6,496,117 B2 * | 12/2002 | Gutta et al. | 340/576 |
| 6,700,692 B2 * | 3/2004 | Tonar et al. | 359/265 |

2003/0142849 A1   7/2003   Lemelson

FOREIGN PATENT DOCUMENTS

JP    11-304428    11/1999

OTHER PUBLICATIONS

European Search Report dated Jul. 17, 2006; Application No. 06110871.8 (4 pages).
Patent Abstracts of Japan, Publication No. 11-304428, Publication Date: Nov. 5, 1999, 1 page.

* cited by examiner

*Primary Examiner*—Jeffery Hofsass
*Assistant Examiner*—Sigmund Tang
(74) *Attorney, Agent, or Firm*—Osha Liang LLP (57) ABSTRACT

A driver image capturing apparatus includes an interior rear-view mirror, an infrared emitter, and an infrared camera. The mirror is mounted at a location obliquely upward and forward from a driver seat. Mounted at a location obliquely upward and backward from the mirror, the infrared emitter emits infrared radiation to the mirror. The camera is pointed at a face of a driver in the driver seat. The mirror has a first reflecting mirror and a second reflecting mirror. The first mirror reflects visible light and transmits infrared radiation. Disposed behind the first mirror at an angle θ relative to the first mirror, the second mirror reflects infrared radiation. The first mirror provides a field of rear vision to the driver. Infrared radiation emitted by the infrared emitter is delivered to the face of the driver through the first and second mirrors, reflected by the face, and received by the camera.

5 Claims, 8 Drawing Sheets

IMAGE CAPTURING APPARATUS AND MONITORING APPARATUS FOR VEHICLE DRIVER

CROSS REFERENCE

This Nonprovisional application claims priority under 35 U.S.C. § 119(a) on Patent Application No. 2005-067255 filed in Japan on Mar. 10, 2005, the entire contents of which are hereby incorporated by reference.

BACKGROUND OF THE INVENTION

The invention relates to driver image capturing apparatus adapted for use in a vehicle to capture a facial image of a driver of the vehicle. The invention further relates to driver monitoring apparatus employing the driver image capturing apparatus.

In order to detect drowsy or inattentive driving, many safety apparatus have been developed that are adapted to capture a facial image, in particular an eye image, of a car driver and to detect condition of the driver based on the captured image.

Such apparatus perform an image capturing process as described below. An infrared camera is mounted on a dashboard or an instrument panel, or near or inside an interior rear-view mirror. The infrared camera is adapted directly to capture a facial image of a driver in a driver seat by receiving infrared radiation reflected by the driver's face. The infrared radiation is used because it provides stable conditions for image capturing and never dazzles the driver.

However, position of the driver's face depends on the driver's physical constitution and posture and on driver seat adjustments. Accordingly, the foregoing image capturing process requires an infrared camera with a field angle wide enough to cover an entire area where the face of the driver is likely to be positioned. Such camera in turn requires a process for recognizing a facial-image area from the captured image having a wide field angle.

In view of the foregoing, JP H11-304428A has proposed an image capturing apparatus adapted to capture an eye image of a driver from behind the driver through an interior rear-view mirror. The apparatus uses reflection of the driver's eyes on the mirror as properly adjusted and viewed from behind.

However, the prior art apparatus has the following problems.

(i) The apparatus can only be mounted at a limited location. In order to capture a facial image with eyes positioned at the center, the apparatus is required to be mounted on a straight line leading rearward from the rear-view mirror.

(ii) The apparatus partially obstructs a field of rear vision of the driver. Thus, the apparatus prevents the rear-view mirror from fulfilling its primary function of providing the field of rear vision to the driver.

(iii) In order to be prevented from interfering the function of the rear-view mirror, the apparatus needs to be small and to be mounted at a distance as great as possible from the mirror.

(iv) The greater the distance between the apparatus and the mirror, the narrower area of image the apparatus will capture through the mirror. The area is a limited one around the eyes of the driver. Thus, it is difficult to capture an image of facial area other than the eyes. Further, there is an increased possibility that a change in facial position of the driver causes the eyes to be excluded from an image to be captured.

(v) Sight of the apparatus gives the driver an uncomfortable feeling of being watched.

In light of the problems, a feature of the invention is to provide a driver image capturing apparatus ensuring capture of an eye image of a driver in a driver's sheet without obstructing the driver's field of rear vision.

SUMMARY OF THE INVENTION

A driver image capturing apparatus adapted for use in a vehicle according to an aspect of the invention includes a rear-view mirror, a driver illuminating device, and an infrared camera. The rear-view mirror is mounted at a location obliquely upward and forward from a driver seat. The rear-view mirror has a first reflector and a second reflector. The first reflector reflects visible light and transmits infrared radiation. The second reflector reflects infrared radiation. The second reflector is disposed behind the first reflector so as to be at an angle $\theta$ relative to the first reflector.

The driver illuminating device is mounted at a location obliquely upward and backward from the rear-view mirror. The driver illuminating device is adapted to emit infrared radiation to the rear-view mirror. The infrared camera has infrared sensitivity and is mounted so as to be pointed at a face of a driver in the driver seat.

According to another aspect of the invention, the driver illuminating device is located on a line inclined at an angle $2\theta$ to a center line of a field of rear vision provided by the first reflector.

According to another aspect of the invention, the infrared camera is a high dynamic range camera with logarithmic response to light intensity. A driver monitoring apparatus according to another aspect of the invention includes the driver illuminating device as described above and an image recognition device. The image recognition device is adapted to detect any one of a face and eyes of the driver out of an image captured by the infrared camera and to determine condition of the driver based on any one of the facial and eye images as detected.

DETAILED DESCRIPTION OF THE INVENTION

Figure 1:
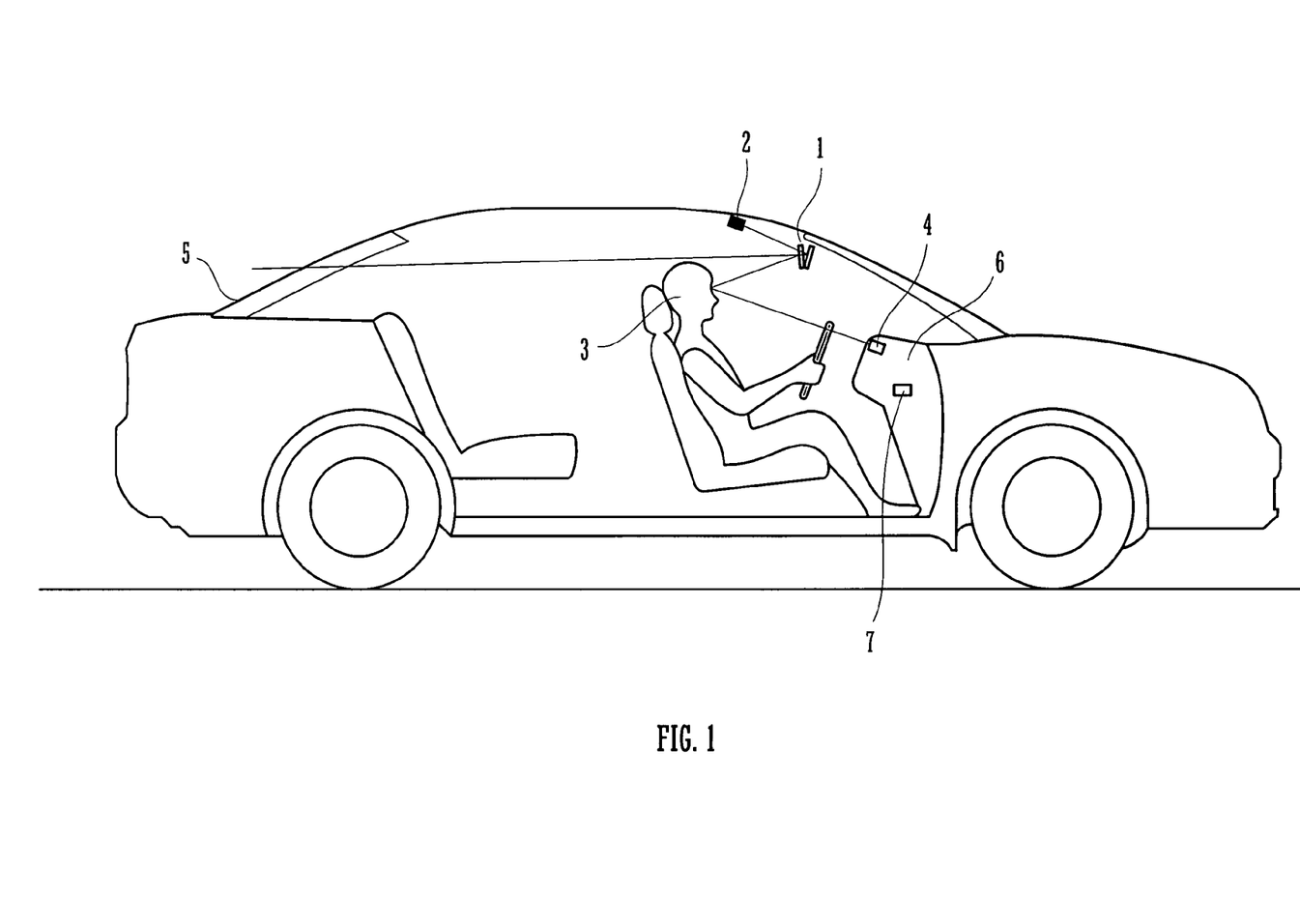
FIG. 1 is a view illustrating a schematic configuration of a driver image capturing apparatus according to an embodiment of the invention.

FIG. 1 is a view illustrating a schematic configuration of a driver image capturing apparatus adapted for use in a vehicle according to an embodiment of the invention. The driver image capturing apparatus illuminates a face of a driver of the vehicle with infrared radiation. The radiation is emitted from a position obliquely upward and backward of the mirror to an interior rear-view mirror, and then reflected on the mirror. The infrared radiation herein includes near-infrared radiation. An infrared camera is mounted forward and slightly downward of a driver in a driver seat. The camera captures an image of a face of the driver by receiving infrared radiation reflected by the face.

The captured facial image is supplied to an image recognition device for facial recognition, detection of, and warning against, drowsy or inattentive driving, etc.

FIG. 1 is a side view of a cabin of a car. With adjustable angles, an interior rear-view mirror such as a mirror 1 is mounted at a location near a roof at center front of the cabin.

The mirror 1 provides a field of rear vision to a driver 3. Prior to operation of the car, the driver 3 in a driver seat manually adjusts the angle of the mirror 1 so that the driver 3 will be able to view an entire rear window 5 through the mirror 1, i.e., so that the driver 3 will be able to see traffic, etc., behind the car through the mirror 1 and the window 5. The mirror 1 as properly adjusted provides the driver 3 with a field of rear vision within which an infrared emitter, such as an LED 2, to be described later is not present.

The LED 2 is mounted on the roof at a location obliquely upward and backward of the mirror 1. The LED emits infrared radiation toward the mirror 1. The mirror 1 has a first reflecting mirror and a second reflecting mirror to be described later. The second mirror is disposed behind the first mirror so as to be at an angle θ relative to the first mirror. The first mirror reflects visible light and transmits infrared radiation. The second mirror reflects infrared radiation. The face of the driver 3 is illuminated with infrared radiation emitted by the LED 2, transmitted by the first mirror, and reflected to the face by the second mirror. Since the driver 3 does not move his or her head very much, infrared radiation emitted by the LED 2 is focused through a lens (not shown), etc., on a range wide enough to cover the mirror 1.

Mounted on a dashboard 6, an infrared camera 4 receives infrared radiation reflected by the face of the driver 3. The camera 4 may be mounted at any other location, such as at center of a steering wheel, that allows the camera 4 to capture an image of the face of the driver 3.

The camera 4 receives the infrared radiation reflected by the face of the driver 3, thereby capturing an image of the face, in particular eyes and an area therearound, of the driver 3.

The camera 4 is preferably an infrared, high dynamic range CMOS (HDRC) camera.

Because of directly received outside light, a car cabin, in particular a driver seat, generally provides the least ideal conditions for cameras to capture images, with extremely high and low luminance levels caused by daytime direct sunlight and nighttime darkness. An infrared HDRC camera approximates the dynamic range, and the logarithmic response to light intensity, of the human eye. Thus, the HDRC camera has a high dynamic range with a constant ratio of 10,000,000:1, brightest to lowest. More specifically, the HDRC camera is capable of capturing images of two objects, in an identical viewfield, with respective illuminances of 0.01 lux and 100,000 lux.

Accordingly, the HDRC camera allows capturing an image of a high-contrast object, such as a face exposed to direct sunlight, while preventing "blown-out highlights" and "flat shadows".

Disposed inside the dashboard 6 is an image recognition device 7 that is adapted to control the LED 2 and performs an image recognition process based on output of the camera 4.

Figure 2:
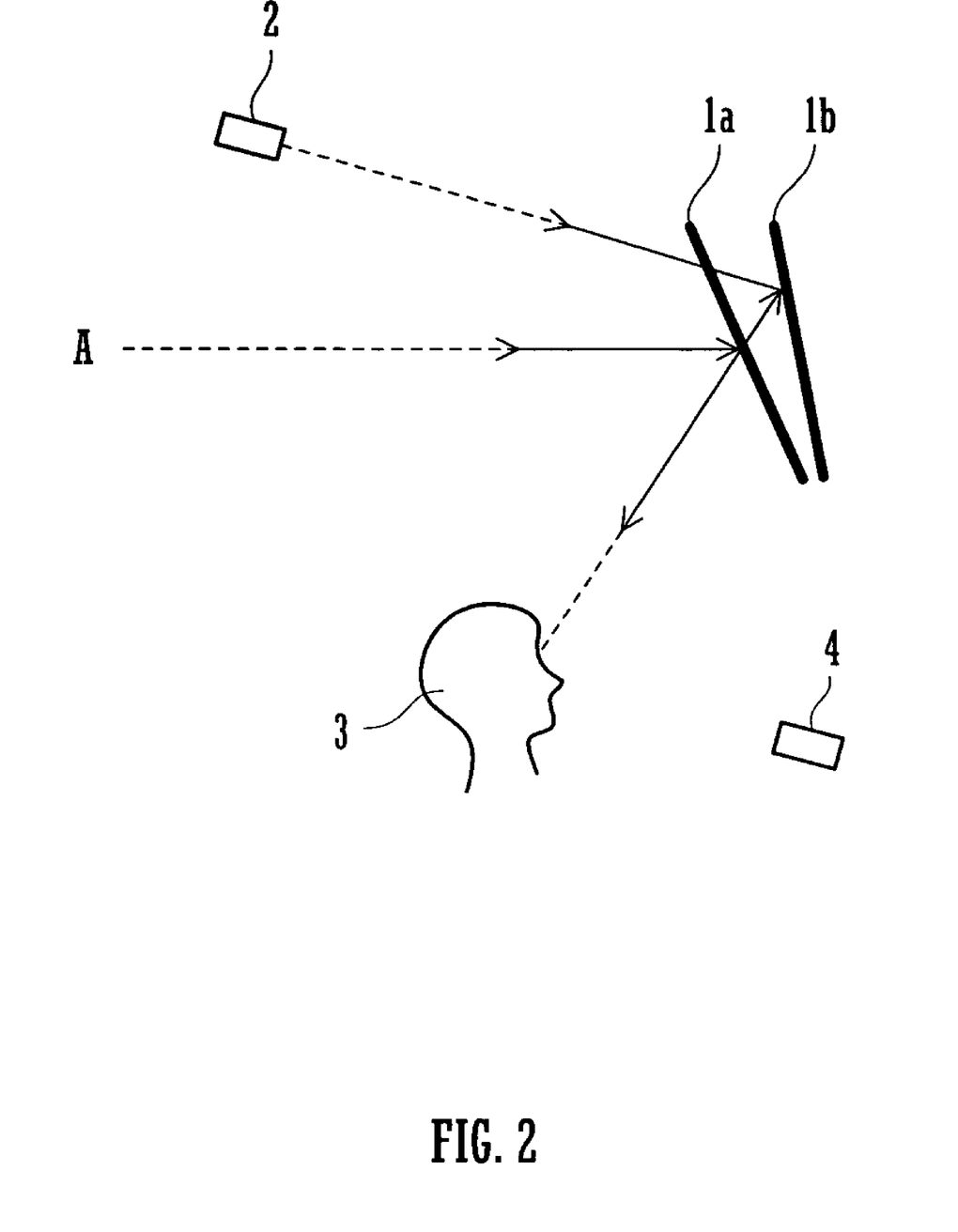
FIG. 2 is a view illustrating a schematic structure of an interior rear-view mirror provided in the apparatus.
Figure 3:
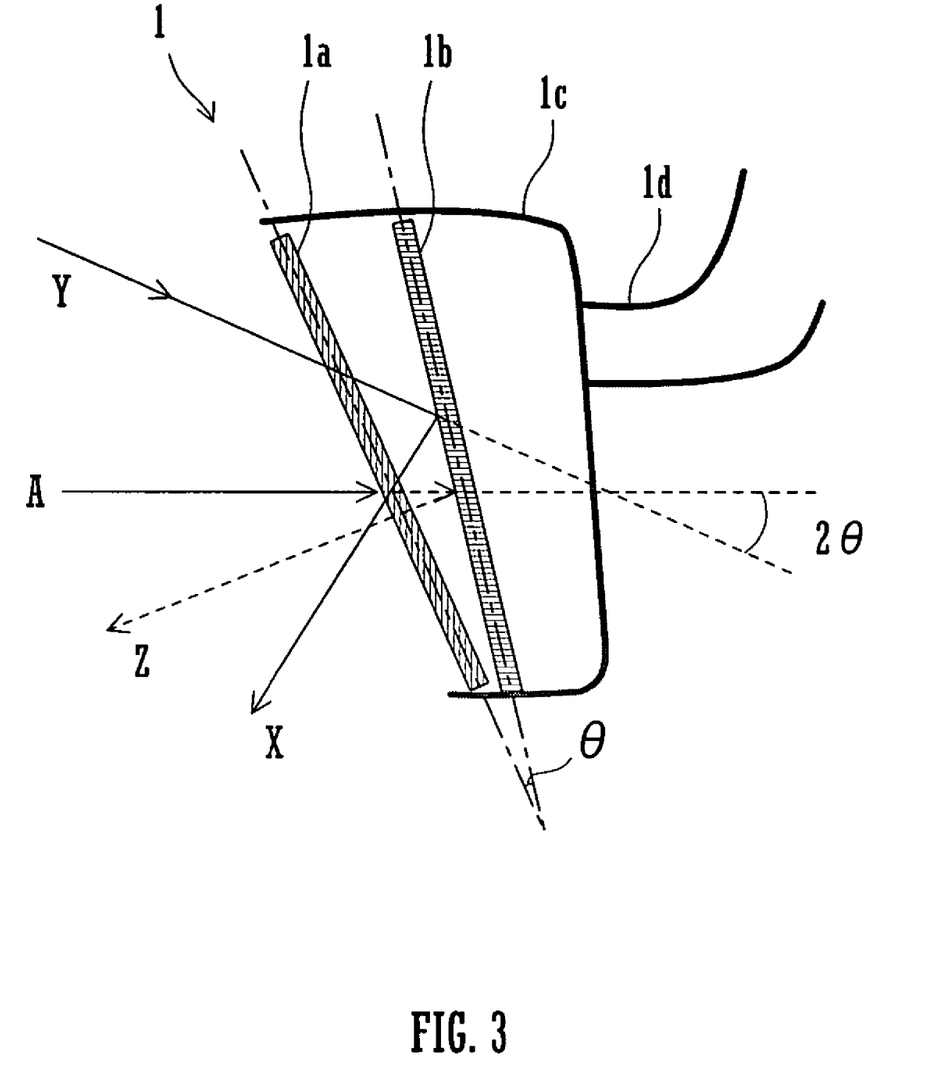
FIG. 3 is a view illustrating a more detailed structure of the interior rear-view mirror.

FIG. 2 is a view illustrating a schematic structure of the mirror 1. FIG. 3 is a view illustrating a more detailed structure of the mirror 1.

The mirror 1 has a first reflecting mirror 1a, a second reflecting mirror 1b, a housing 1c, and a support arm 1d. Inside the housing 1c, the mirror 1b is disposed behind the mirror 1a so as to be at an angle θ relative to the mirror 1a. The arm 1d is undetachably mounted on a frame of the car. The housing 1c is mounted on the arm 1d so as to be rotatable from side to side and up and down. Thus, the mirror 1 is adjustable so as to provide an improved rearward visibility to the driver 3.

In the present embodiment, the mirrors 1a and 1b are fixedly disposed at the angle θ to each other. Alternatively, the mirrors 1a and 1b may be disposed with adjustable angles so that the camera 4 can capture images of different facial areas or so that the LED 2 can be mounted at different locations. The mirror 1a is a cold mirror having the characteristics that the mirror 1a reflects visible light and transmits infrared radiation emitted by the LED 2.

In the present embodiment, the LED 2 emits radiation that lies in a range of 900 nm to 1040 nm in the near-infrared region of the electromagnetic spectrum, mainly at a wavelength of 950 nm. Thus, the mirror 1a transmits light at wavelengths of 900 nm or higher, and reflects light at wavelengths of 400 nm to 700 nm, i.e., visible light. Cold mirror as used in the present embodiment is made of glass with an interference film vacuum-deposited on one surface. It is to be noted that the mirror 1a is not limited to the cold mirror, but may be any other kind of mirror having the optical properties as described above.

The mirror 1b reflects infrared radiation at wavelengths of 800 nm to 1040 nm. The mirror 1b may reflect, absorb, or transmit light at any other wavelength. The mirror 1b as used in the present embodiment is an inexpensive, easily available silver mirror that is made of glass with a thin film of silver deposited on one surface thereof.

Referring to FIG. 3, the mirror 1a reflects the visible light range of light incident on the mirror 1 along a center line A of the field of rear vision (hereinafter referred to merely as the incident light). The reflected light is directed in a direction X toward the eyes of the driver 3. The LED 2 emits infrared radiation in a direction Y. The infrared radiation is transmitted by the mirror 1a, reflected by the mirror 1b in the direction X, and then transmitted again by the mirror 1a. The infrared radiation is then reflected by the face of the driver 3, and finally received by the camera 4. Thus, a facial image of the driver 3 is captured by the camera 4. In addition, the infrared range of the incident light is transmitted by the mirror 1a, and reflected by the mirror 1b in a direction Z.

The camera 4 has a wide field angle enough to cover the entire face of the driver 3.

With the mirrors 1a and 1b at the angle θ to each other, visible light and infrared radiation incident on the mirror 1a from the identical direction X are reflected in respective directions by the mirrors 1a and 1b, respectively. According to optical principles, the directions are always at an angle 2θ to each other, irrespective of angles of incidence of the visible light and infrared radiation on the mirror 1a. This is also true with reversed directions of incident lights. More specifically, the infrared radiation incident from the direction Y that is to be reflected in the direction X is always at an angle 2θ with the visible light incident along the center line A, irrespective of incident angle of the visible light along the line A.

The foregoing structure of the mirror 1 allows the driver 3 to use the mirror 1a as a common rear-view mirror while preventing the driver 3 from being dazzled by infrared radiation, which is not invisible to the human eye, emitted by the LED 2 and reflected by the mirror 1b. The mirror 1 ensures that the mirror 1a provides the driver 3 with the field of rear vision and that the mirror 1b reflects the infrared radiation emitted by the LED 2 and thereby delivers the radiation to the camera 4 for capturing a facial image of the driver 3.

As described above, the mirror 1a is adjusted so as to provide the driver 3 with the field of rear vision. Thus, the mirror 1a enables the camera 4 to capture an infrared-illuminated portion of the facial area around eyes of the driver 3, irrespective of position of the face of the driver 3.

The foregoing description is made on location of the LED 2 on a vertical plane, but is also true with location of the same on a horizontal plane. On each of the vertical and horizontal planes, in other words, the LED 2 is mounted at a location on a line tilted at the angle 2θ to the center line A, thereby allowing capture of the facial image, in particular eye image, of the driver 3. The face of the driver 3 is the only infrared-illuminated area and is thus easy to detect without any cumbersome procedure.

Figure 4:
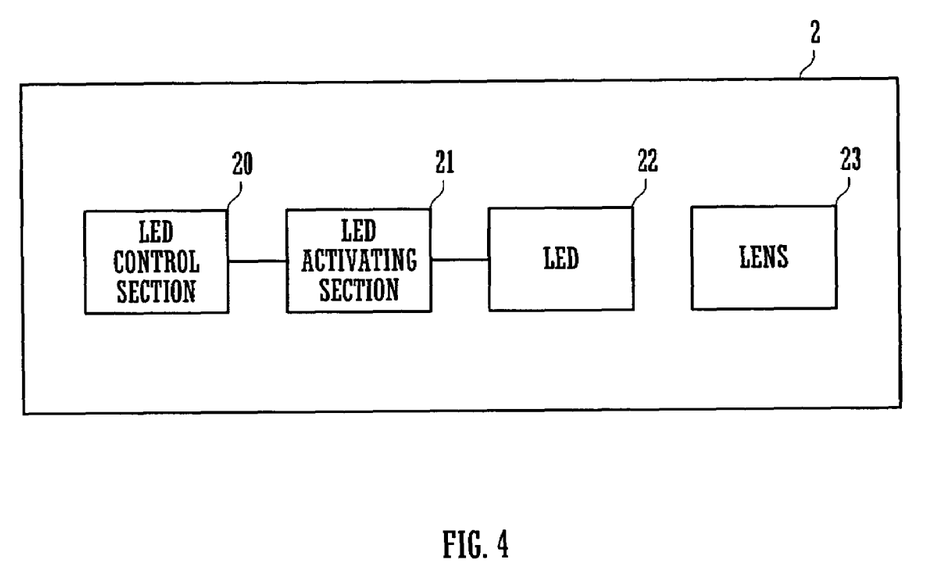
FIG. 4 is a block diagram illustrating a schematic configuration of an LED.

FIG. 4 is a block diagram illustrating a schematic configuration of the LED 2.

An LED control section 20 controls emission of infrared radiation and amount of radiation to be emitted. In order to prevent wasteful power consumption and heat radiation, for example, the section 20 can be adapted to allow the emission only when an image is to be captured. Also, the section 20 can be adapted to control the amount of radiation to be emitted so that the emitted radiation compensates for weakness of infrared light that is externally provided. In addition, the section 20 can be adapted to control emission of infrared radiation so that the radiation is emitted in time with capture of a facial image of the driver 3 by the camera 4. Also, the section 20 can be adapted to compare respective images captured when the radiation is emitted and not emitted.

Based on instructions of the section 20, an LED activating section 21 supplies electric current to an LED section 22. The section 21 controls amount of electric current to be supplied to the section 22, thereby adjusting intensity of infrared radiation to be emitted.

The section 22 is a single infrared LED, or a set of a plurality of infrared LEDs. The section 22 is activated by the section 21 to emit infrared radiation. The section 22 as used in the present embodiment is a near-infrared LED that emits near-infrared radiation at wavelengths of 900 nm to 1040 nm, mainly at a wavelength of 950 nm. A typical LED with the feature is commercially available as "GL381" manufactured by Sharp Kabushiki Kaisha, for example. Number of LEDs required for the section 22 depends on required amount of infrared radiation and on amount of emission of each LED. The infrared radiation at the above-described wavelengths has the characteristics that it is invisible to the human eye, shows reflectivity sufficient for capturing a facial image of the driver 3, does not require an expensive image sensor, is not attenuated very much in the air. It is to be noted that Infrared radiation at other wavelengths with the characteristics may be used.

A lens 23 focuses the infrared radiation emitted by the LED section 22 so that the emitted radiation has an appropriate angle of divergence. In the present embodiment, the emitted radiation has a sufficient angle of divergence to cover the entire mirror 1. The sufficient angle of divergence is obtained from the following expression: $2* \tan^{-1}(100/300)$, where radius of circle with the mirror 1 on its circumference is 100 mm, and distance between the LED 2 and the mirror 1 is 300 mm. Therefore, the angle of divergence is approximately 37 degrees. Assume that the mirror 1 has respective horizontal and vertical lengths of 200 mm and 50 mm and that distance between the mirror 1 and the face of the driver 3 is 400 mm. With the angle of divergence, a facial area of the driver 3 to be captured has respective horizontal and vertical lengths of 466 mm and 116 mm. This size is sufficient for capturing an eye image of the driver 3. The lens 23 is dispensable if use efficiency of infrared radiation is not to be taken into consideration or if directivity of radiation of the infrared LEDs provides the sufficient angle of divergence as described above.

Figure 5:
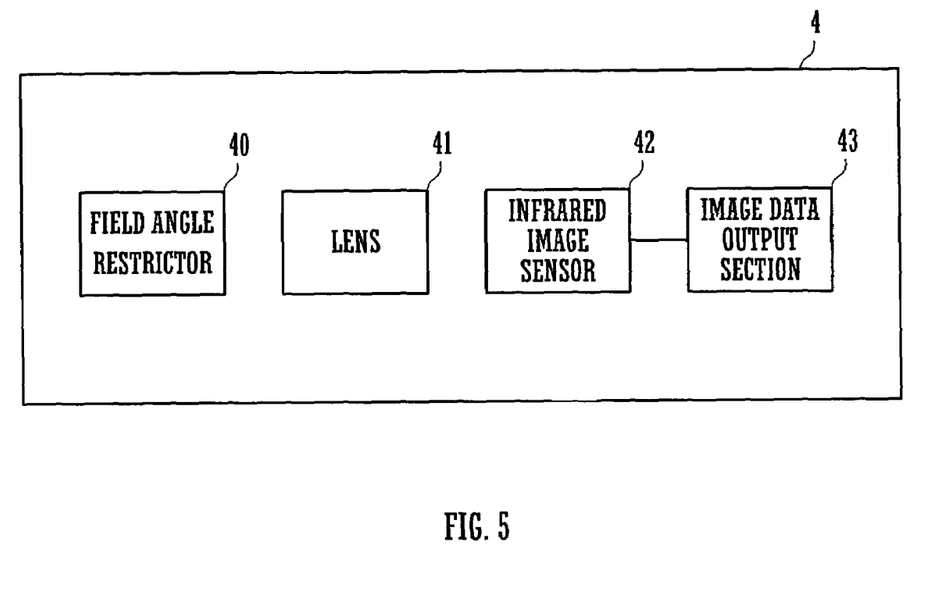
FIG. 5 is a block diagram illustrating a schematic configuration of an infrared camera.

FIG. 5 is a block diagram illustrating a schematic configuration of the camera 4.

The infrared radiation received by the camera 4 travels through a field angle restrictor 40 such as a hood, and is focused by a lens 41 to produce an image on an infrared image sensor 42. The image is converted into electronic data, and is output as image data by an image data output section 43.

The restrictor 40 is provided for blocking lights other than the infrared radiation reflected by the mirror 1. The lights are hereinafter referred to merely as the other lights. The other lights are not only unnecessary, but also undesired because such lights cause flare, ghost, or stray lights that result in image noise. Accordingly, it is preferable to use the restrictor 40 to prevent incidence of the other lights on the image sensor 42. The mirror 1 is rotatable within a limited, and therefore predictable, range. This is because the rotational movement is a small, limited one, around a rotation mechanism provided at a connection between the housing 1c and the arm id, that is made in order to provide the driver 3 with a field of rear vision through the window 5. Thus, the restrictor 40 is used to prevent incidence of unnecessary light on the image sensor 42 while allowing image capturing within the entire rotatable range of the mirror 1. The restrictor 40 is dispensable if negative effects of unnecessary lights are not to be taken into consideration or if the lens 41 doubles as a field angle restrictor.

The image sensor 42 as used in the present embodiment is sufficiently sensitive to the wavelengths of the infrared radiation emitted by the LED 2. In the present embodiment, as described above, the emitted radiation lies in a range of 900 nm to 1040 nm in the near-infrared region of the electromagnetic spectrum, with a peak wavelength of 950 nm. As the image sensor 42, a CCD or CMOS image sensor using silicon photodiode technology is usable because silicon photodiodes are generally sensitive not only to the visible light region of the spectrum, but also to a range of up to 1100 nm of the near-infrared region. For example, a CCD image sensor ICX429ALL manufactured by Sony Corporation is suitable for use as the image sensor 42. This is because the sensor ICX429ALL shows approximately 20% of its peak sensitivity to infrared radiation of a wavelength of 950 nm. A high dynamic range CMOS image sensor utilizing silicon photodiodes having similar infrared-sensitivity is more suitable for use. Additionally, a device such as a filter that blocks visible light and transmits infrared radiation may be used to prevent the image sensor 42 from sensing the other lights.

An image captured by the camera 4 is supplied as image data to the image recognition device 7 as shown in FIG. 1.

The device 7 processes the image data and recognizes, from facial information on the driver 3 that the image data contains, necessary information on condition of the driver 3 for performing safety and amenity functions. Then, the device 3 outputs the recognized information. There can be many possible functions to be performed based on the recognized information on condition of the driver 3. In the present embodiment, the device 7 functions to detect an eye direction of the driver 3 for detecting inattentive driving.

One approach to detecting inattentive driving is to detect an eye direction of the driver 3 in order to determine that the eyes of the driver 3 are oriented in the right direction at the right time. This approach is more precise and more reliable than an approach where facial orientation of the driver is used to detect inattentive driving. Compared to the latter approach, however, the former approach involves a highly sophisticated image recognition process because this approach requires quick and precise detection of the eyes of the driver 3 from the captured image.

Figure 6:
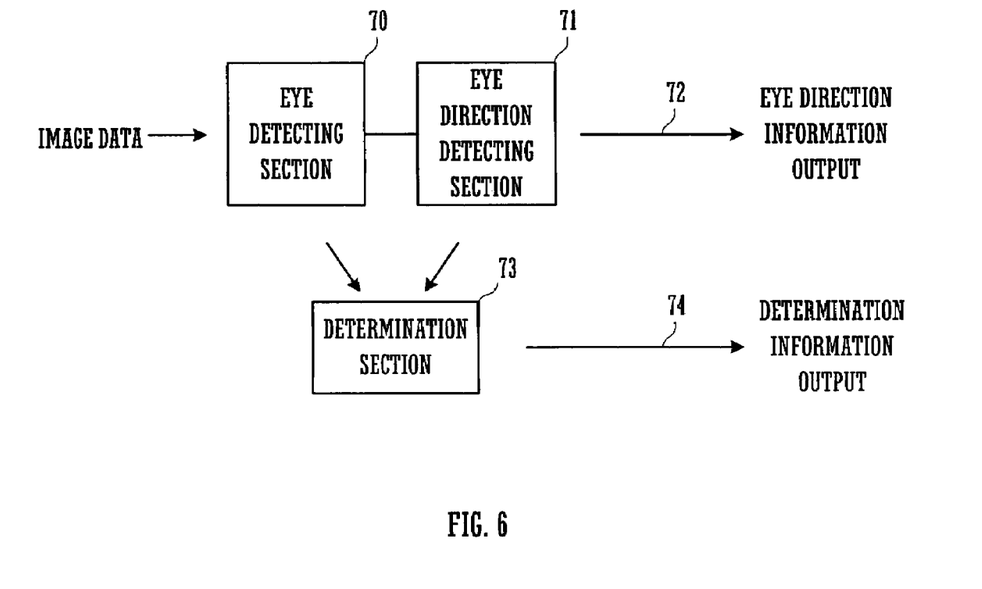
FIG. 6 is a block diagram illustrating a schematic configuration of an image recognition device.

FIG. 6 is a block diagram illustrating a schematic configuration of the image recognition device 7.

The image data as supplied by the camera 4 is sent to an eye detecting section 70. The section 70 detects eyes of the driver 3 out of the image data, and then supplies the detected eye image data to an eye direction detecting section 71.

Simultaneously, the section 70 supplies, to a determination section 73, information on eye detection result, hereinafter referred to as first detection information. The section 71 determines an eye direction based on entire shape of the eyes and relative position of pupil in the eyes detected from the eye image data. The section 71 outputs the determined eye direction as eye direction information 72. Simultaneously, the section 71 supplies, to the section 73, information on eye direction detection result, hereinafter referred to as second detection information.

Based on the first and second detection information, the determination section 73 determines condition of the eyes and outputs the determined condition as determination information 74. When the eyes are not detected, for example, the information 74 indicates failed eye detection. The information 74 is further used to indicate a possibility that the driver 3 is not facing forward. When the eyes are successfully detected but an eye direction is not detected, the information 74 indicates failed eye direction detection. The information 74 is further used to indicate a possibility that the eyes of the driver 3 are closed. When the eyes are not detected but an eye direction is successfully detected, the information 74 indicates that there is a high possibility that some false recognition occurs in an image recognition process. The information 74 may be further used as information to indicate reliability of the eye direction information 72 as output.

Figure 7A:
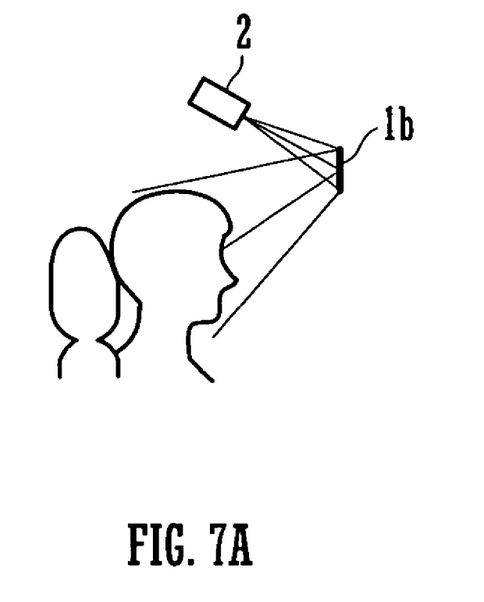
FIGS. 7A and 7B are views illustrating different placements of the LED.
Figure 7B:
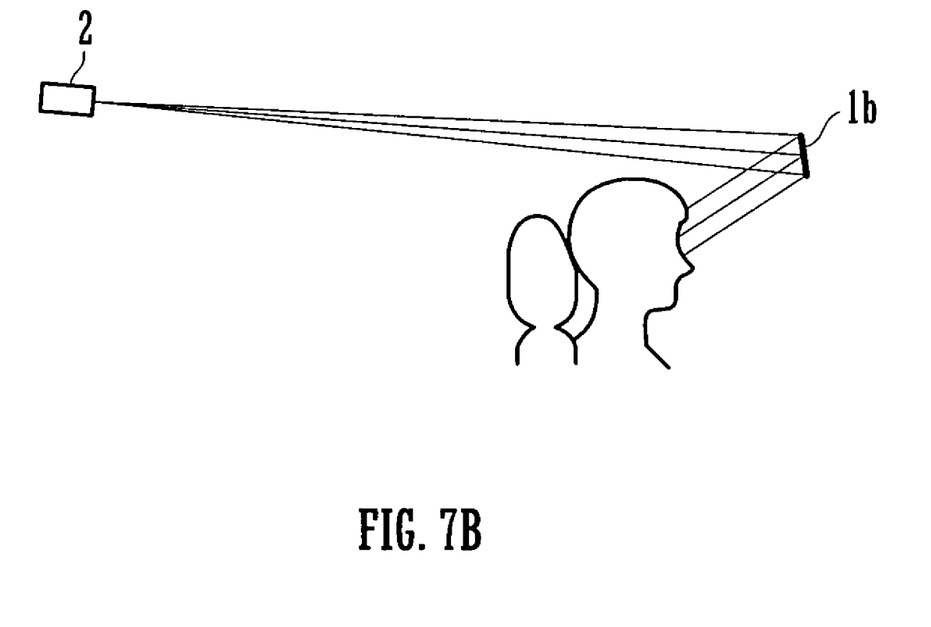

FIGS. 7A and 7B are views illustrating different placements of the LED 2.

Figure 8:
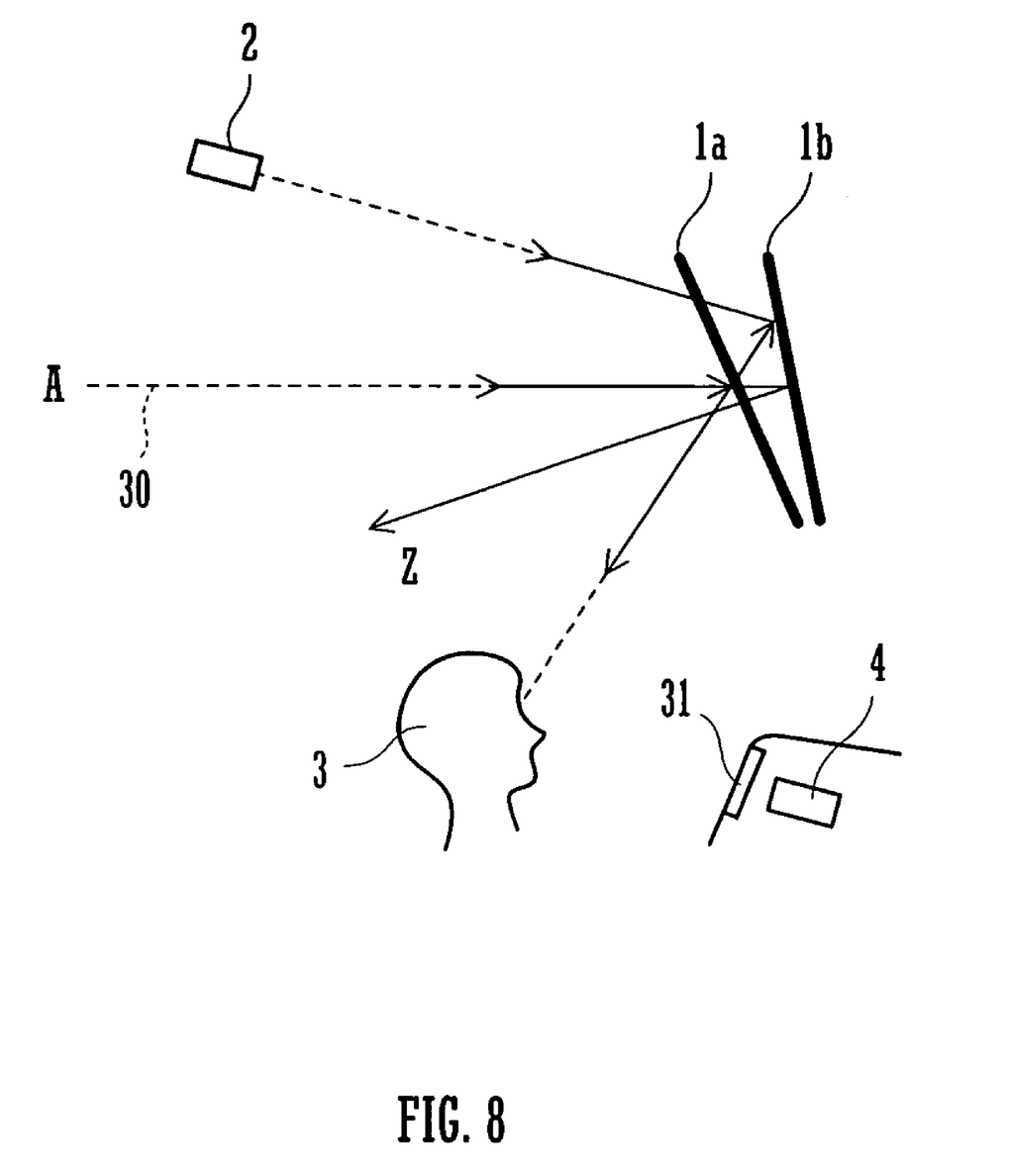
FIG. 8 is a view illustrating a cover for concealing the infrared camera.

The angle θ between the first mirror 1a and the second mirror 1b are arbitrarily adjustable within a range from 0 degree to 90 degrees. Thus, the adjustable angle θ allows greater flexibility in location of the LED 2. Referring to FIG. 7A, for example, the LED 2 located near the mirror 1b illuminates a wide area around the eyes of the driver 3. Referring to FIG. 7B, in contrast, the LED 2 located at a distance from the mirror 1b illuminates a narrow area around the eyes. At either location, the LED 2 is prevented from obstructing the field of rear vision of the driver 3. The LED 2 illuminates the facial area containing the eyes of the driver 3 in an effective manner, irrespective of position of the face of the driver 3. This allows a reduction in total amount of radiation to be emitted by the LED 2, compared to illuminating an entire field that is likely to contain the eyes of the driver 3. This is advantageous in terms of costs, power consumption, heat radiation, and miniaturization of the LED 2. Referring to FIG. 8, external light 30 containing infrared radiation, such as glare of headlights of a car immediately behind the instant car, is sometimes delivered to the mirror 1.

Conventional rear-view mirrors will reflect such incident light, so that high-intensity infrared radiation is delivered to the driver 3. According to the present embodiment, in contrast, the external light 30 is transmitted by the first mirror 1a and reflected in the direction Z, i.e., in a different direction from the direction toward the face of the driver 3, by the second mirror 1b. Thus, the light 30 has little negative influence on a facial image to be captured.

Referring again to FIG. 8, a cover 31 that reflects visible light and transmits infrared radiation is provided for covering a light receiving section of the camera 4, so that the camera 4 is entirely concealed from view of the driver 3. The cover 31 contributes to eliminate an uncomfortable feeling of being watched that sight of the camera 4 gives the driver 3 while offering greater flexibility in interior design of the car.

The invention is applicable not only to cars as described in the foregoing embodiments, but also to any other kind of vehicle such as railroad trains or vessels.

What is claimed is:

1. A driver image capturing apparatus adapted for use in a vehicle, the driver image capturing apparatus comprising:
   a rear-view mirror mounted at a location obliquely upward and forward from a driver seat, the rear-view mirror including:
      a first reflector for reflecting visible light and transmitting infrared radiation; and
      a second reflector for reflecting infrared radiation, the second reflector being disposed behind the first reflector so as to be at a predetermined angle θ relative to the first reflector;
   a driver illuminating device adapted to emit infrared radiation to the rear-view mirror, the driver illuminating device being mounted at a location obliquely upward and backward from the rear-view mirror; and
   an infrared camera with infrared sensitivity, the infrared camera being mounted so as to be pointed at a face of a driver in the driver seat.

2. The driver image capturing apparatus according to claim 1, wherein the driver illuminating device is located on a line inclined at a predetermined angle 2θ to a center line of a field of rear vision provided by the first reflector.

3. The driver image capturing apparatus according to claim 1, further comprising a cover for concealing the infrared camera, the cover reflecting visible light and transmitting infrared radiation.

4. The driver image capturing apparatus according to claim 1, wherein the infrared camera is a high dynamic range camera with logarithmic response to light intensity.

5. A driver monitoring apparatus comprising:
   the driver image capturing apparatus of claim 1; and an image recognition device adapted to detect any one of a face and eyes of the driver out of an image of the driver captured by the infrared camera, and to determine condition of the driver based on any one of the facial and eye images as detected.

* * * * *